F. W. TAYLOR.
PLANT GROWING APPARATUS.
APPLICATION FILED NOV. 1, 1909.
1,033,290.
Patented July 23, 1912.
4 SHEETS—SHEET 1.
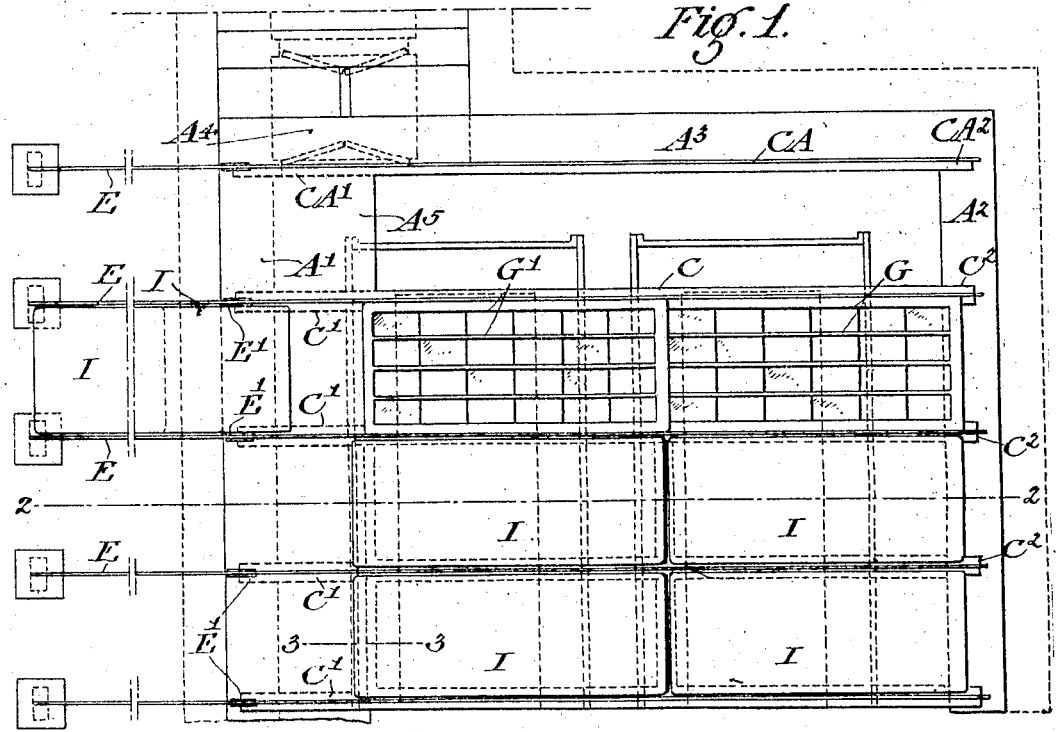
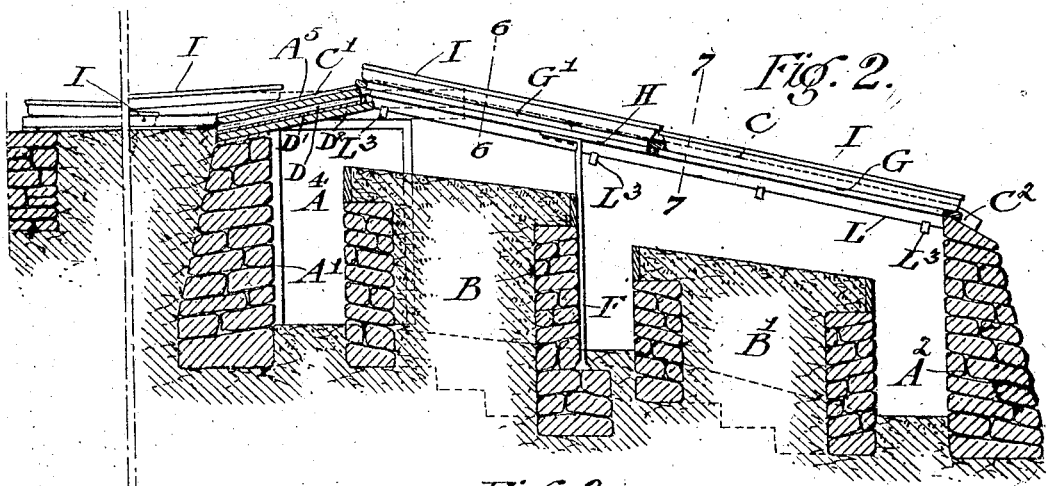
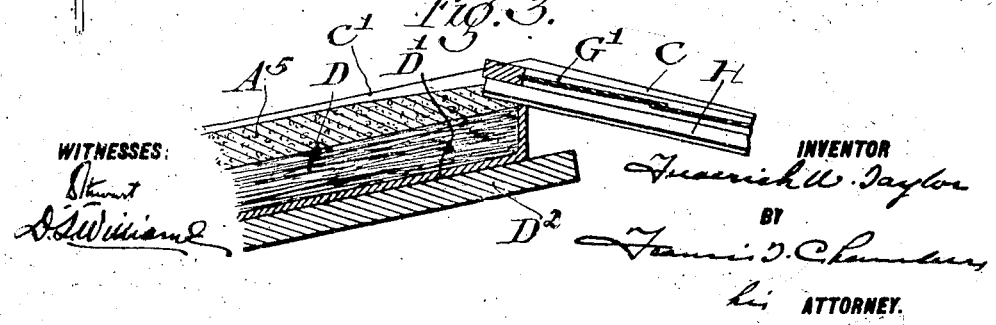
WITNESSES:
INVENTOR
Frederick W. Taylor
BY
ATTORNEY.

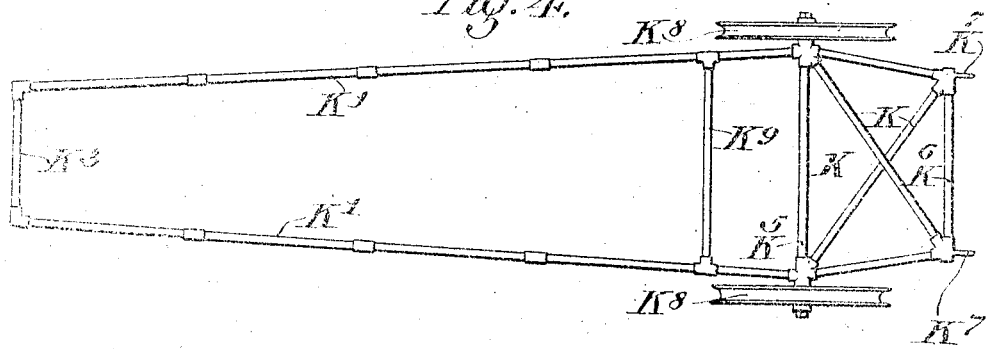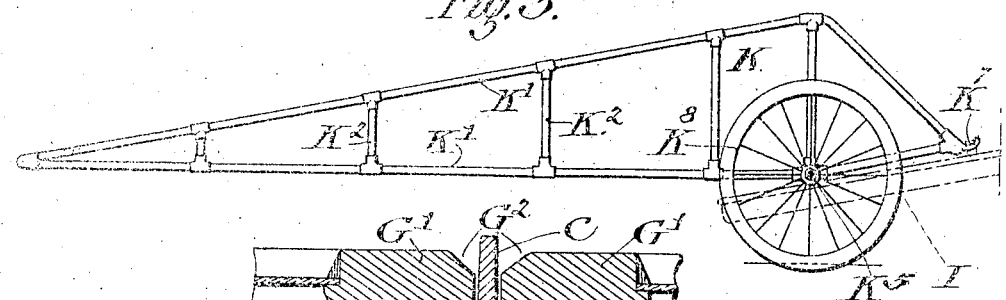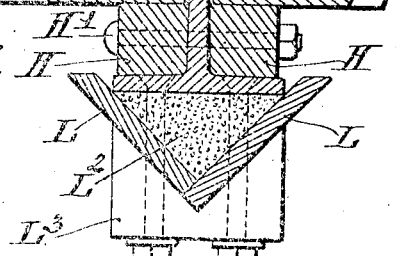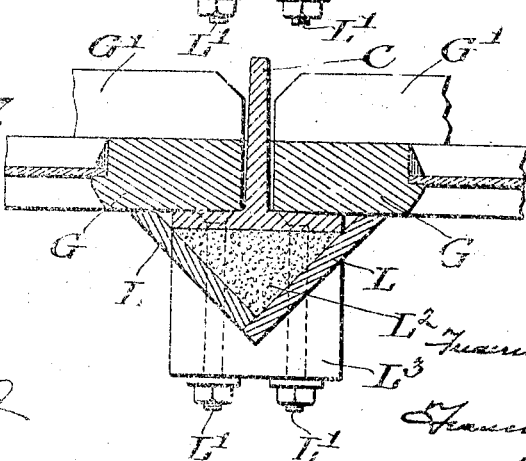

F. W. TAYLOR.
PLANT GROWING APPARATUS.
APPLICATION FILED NOV. 1, 1909.
1,033,290.
Patented July 23, 1912.
4 SHEETS—SHEET 3.
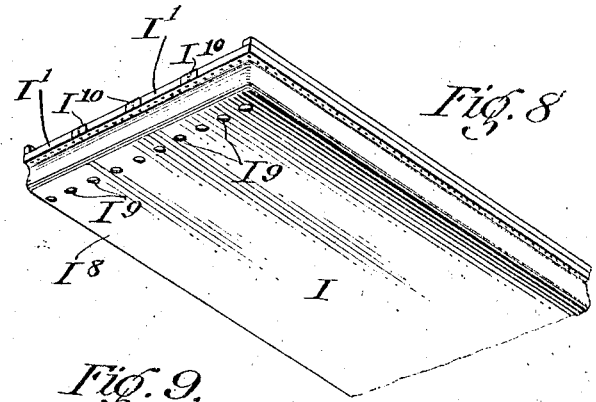
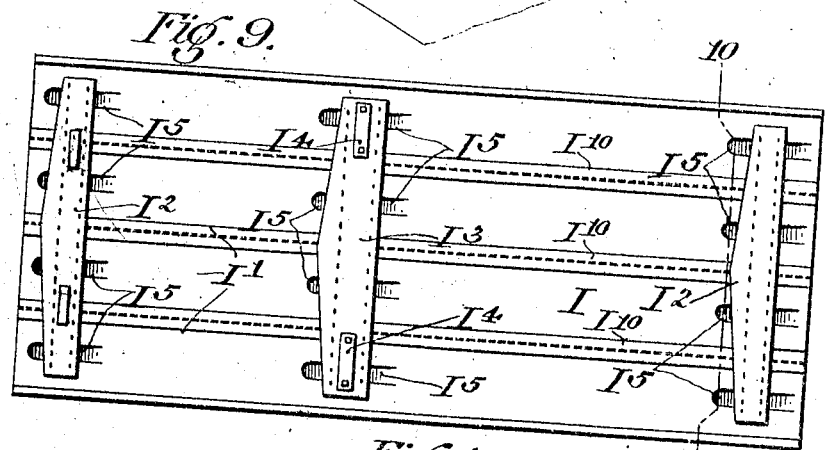
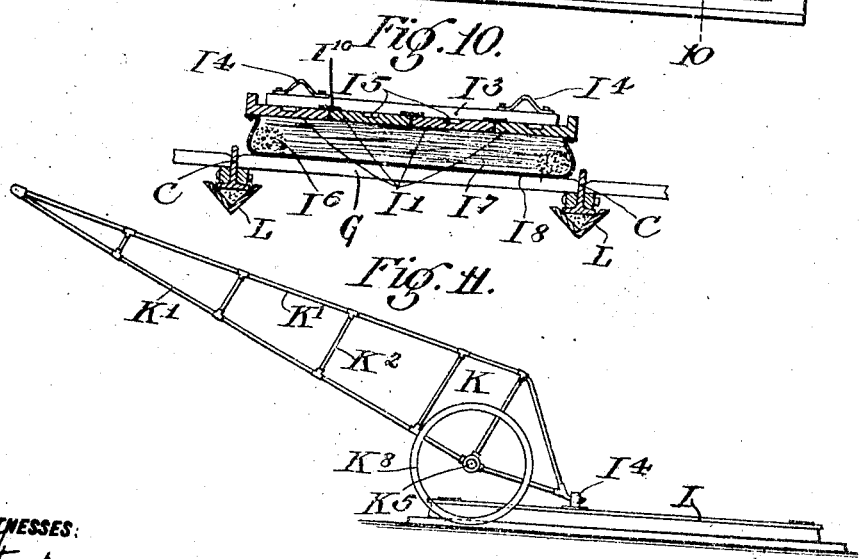
WITNESSES:
INVENTOR
ATTORNEY.

F. W. TAYLOR.
PLANT GROWING APPARATUS.
APPLICATION FILED NOV. 1, 1909.
1,033,290.
Patented July 23, 1912.
4 SHEETS—SHEET 4.
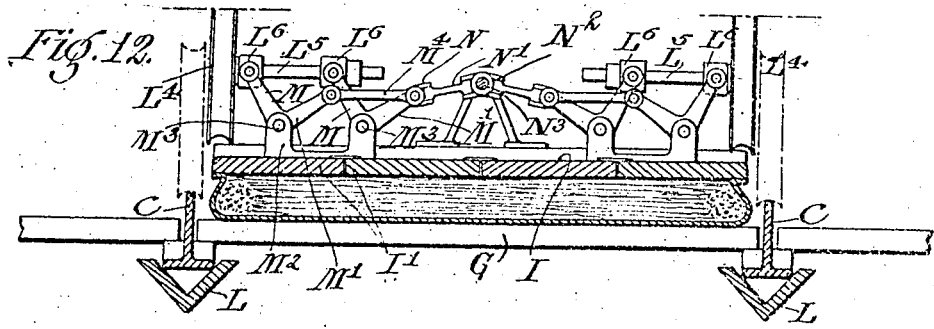
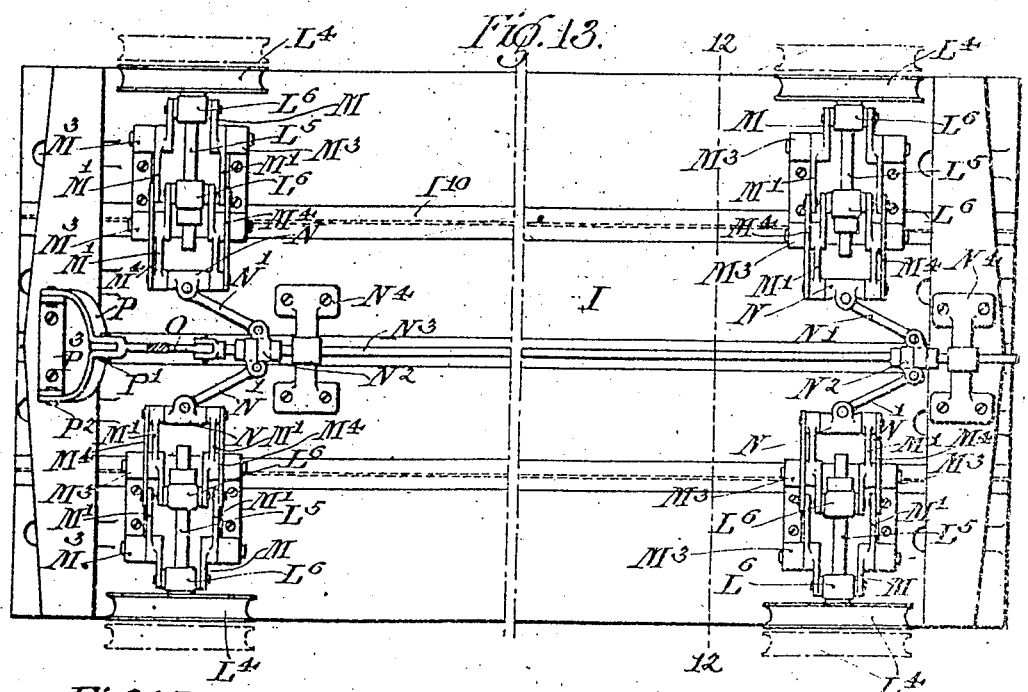
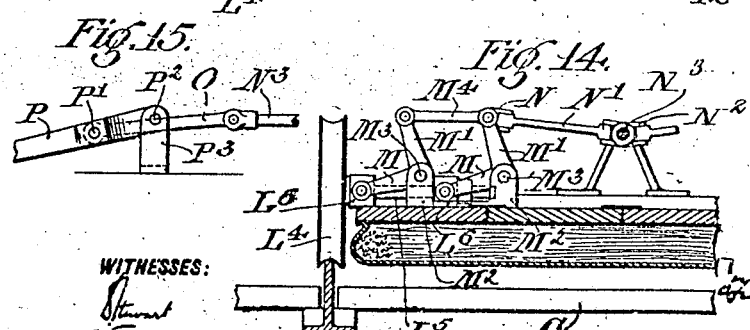

UNITED STATES PATENT OFFICE.

FREDERICK W. TAYLOR, OF PHILADELPHIA, PENNSYLVANIA.

PLANT-GROWING APPARATUS.

1,033,290.

Specification of Letters Patent.   Patented July 23, 1912.

Application filed November 1, 1909. Serial No. 525,670.

*To all whom it may concern:*

Be it known that I, FREDERICK W. TAYLOR, a resident of Philadelphia, in the county of Philadelphia and State of Pennsylvania, have invented a certain new and useful Improvement in Plant-Growing Apparatus, of which the following is a true and exact description, reference being had to the accompanying drawings, which form a part thereof.

My present invention relates to the construction of, and to apparatus used in connection with, forcing pits or cold beds for growing plants. With such pits or beds the heat of the sun is employed in maintaining a temperature in the pits or beds substantially above the average temperature of the surrounding atmosphere. Such pits or beds, wholly or partially sunk into the earth, and provided with the usual inclined glass roofs, have long been known and used. Heretofore, the extensive use of such pits or beds at seasons and in localities where they are subjected to very low temperatures from time to time, as during cold rains, or snow storms, or in cloudy weather, or in the night time in seasons of the year in which the external temperature is low except when the sun is shining brightly, has been prevented by the difficulty experienced in maintaining a sufficiently high temperature in the pits or beds under unfavorable conditions. Various arrangements for covering the glass roofs of such pits or beds, at periods when otherwise the pits or beds would give up their heat and fall in temperature too rapidly, have been suggested, and some of such arrangements have been used in practice. The arrangements heretofore employed, however, have not gone into extensive or even appreciable use except in the case of small pits or beds, because of the difficulty of providing and manipulating roof covering devices which, on the one hand, have proper heat insulating and protective properties, and, on the other hand, are sufficiently durable and not too expensive to construct and maintain, and at the same time can be manipulated easily and at a small labor cost, and without an excessive expenditure for equipment.

The object of the present invention is the provision of a roof construction, removable sash covers, and apparatus for manipulating the covers, which will permit the effective and economical use of forcing pits or beds of relatively large size during periods of the year and in localities in which the weather conditions are, or from time to time may be, quite severe.

In carrying out my invention I form the framework of the roof of the forcing pit or bed of beams, preferably in the form of flanged bars, which serve not only as supports for the roof sashes, but also for the means employed for transporting the large and heavy sash covers employed into and out of their operative positions over the roof sashes. These covers I form with a rigid backing and I preferably employ, for transporting the covers, a vehicle having wheels adapted to run on the roof beams and having provisions by which the vehicle or truck may be readily connected to and disconnected from the covers, and when connected to the covers serves to readily lift and transport them from the roof to a suitable storing place and back. Instead of using a separate cover transporting vehicle or truck, I may provide each cover with track rail engaging devices, preferably wheels, which can be swung relative to the covers from a position in which they lie between the track rails and permit the cover to rest on the roof sash, into a position in which they engage the track rails and through them hold the cover above the sash.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described one of the forms in which the invention may be embodied.

Of the drawings, Figure 1 is a plan view of a portion of a forcing bed constructed in accordance with my present invention, with some of the sashes removed and some in place, and with only some of the sashes in place covered by protective covers or pads. Fig. 2 is a sectional elevation on the line 2—2 of Fig. 1. Fig. 3 is a sectional elevation, taken similarly to Fig. 2, but on a larger scale and showing a portion of the roof construction in greater detail than it is shown in Fig. 2. Fig. 4 is a plan view, and Fig. 5 an end elevation, of the cover removing and replacing vehicle. Figs. 6 and 7 are partial sectional elevations on the lines 6—6 and 7—7, respectively, of Fig. 2. Fig. 8 is a perspective view of a portion of one of the covers. Fig. 9 is a plan view of the cover. Fig. 10 is a section on the line 10—10 of Fig. 9, and showing also the relative positions of the cover, protected sash, and supporting beams, when the cover is in place. Fig. 11 is an elevation showing the relative positions of the vehicle and cover when the vehicle is in position to engage and lift the cover. Fig. 12 is a section on the line 12—12 of Fig. 13, and is a view generally similar to Fig. 10, but illustrating a cover construction having transporting wheels permanently but adjustably secured thereto. Fig. 13 is a plan view of a modified cover construction. Fig. 14 is a partial section taken similarly to Fig. 12, showing the parts in a different relation from that shown in Fig. 12, and Fig. 15 is an elevation of a portion of the operating mechanism.

In the drawings, and referring first to Figs. 1, 2 and 3, $A^1$, $A^2$ and $A^3$ represent side walls of the forcing pit, and $A^4$ the entrance to the pit through the wall $A^3$. The walls $A^1$, $A^2$, $A^3$, are surrounded by earth. They may be, and usually are, simply sunk below the surface of the ground, and are preferably what are known as dry walls, so that spaces are left between the stones or the like to permit the transfer of heat from the surrounding earth to the interior of the forcing pit. Within the forcing pit are arranged the usual beds B and $B^1$, separated from each other and from the walls $A^1$, $A^2$ and $A^3$, by suitable passageways. The roof beams are formed by flanged metal bars C and CA. As shown, the bars C are of the shape known as T bars (see Figs. 6 and 7), while the bar CA, at the end of the forcing bed, is an angle bar. The top of the wall $A^1$ is higher than the top of wall $A^2$, and the bars C and CA are correspondingly inclined, and at their lower ends have portions $C^2$, $CA^2$, respectively, bent down to assist in obtaining a secure anchorage of these ends to, or in, the lower wall $A^2$. The outer ends $C^1$ and $CA^1$ are similarly bent downward to assist in securing them to the upper wall $A^1$, and in the construction shown, the portions $C^1$ and $CA^1$ are of sufficient length so that they project over a portion of the forcing bed proper and are embedded in a concrete shelf $A^5$ which is backed at its underside by a layer of heat insulating material D, such as straw or like material, inclosed by a heat retaining frame $D^1$, the latter being supported by a layer $D^2$ of wooden boards or the like.

Beyond the walls $A^1$, runways or track rails are provided for the purpose hereinafter described, by suitably supported, substantially horizontal, metal bars E, which are in alinement with the vertical flanges of the bars C and CA, and may, of course, be replaced by integral extensions of the bars C and CA, though the latter construction is slightly more expensive. In the form shown, there is a lower sash G and an upper sash $G^1$ in the panel or space between each adjacent pair of beams C and between the end beam CA and adjacent beam C. These sashes may be of the usual construction, with the glass supported by the usual wooden frame and suitable cross bars. The lower sashes G rest directly at their side edges on the lateral flanges of the corresponding bars C, CA (see Fig. 7), and rest at their lower ends on the end wall $A^2$. The lower ends of the upper sash $G^1$ overlap and rest on the upper ends of the corresponding lower sash. The sides of the upper sash are supported by strips H, preferably formed of wood, and slightly wedge shaped, with their thicker ends lowermost. The strips H are secured to bars C, CA, by suitable means, as by the bolts $H^1$ (see Fig. 6) extending through the vertical flanges of the bars. The upper ends of the sash $G^1$ rest on the upper end of the shelf $A^5$. To guard against the cooling of the interior of the forcing pit by radiation to, and conduction through, the beams C, the latter are preferably insulated, as shown, by boards L secured to the beams by bolts $L^1$ passing through the lateral flanges of the beams, the boards L, and suitable spacing blocks $L^3$. The space $L^2$, triangular in cross section, between the base of each beam C and the corresponding boards L may be filled with straw or the like. The boards L not only serve as heat insulating devices, but also as stiffening devices for the beams, and the latter may be supported, each at one or more places, between its ends, by suitable uprights or posts F, as shown in Fig. 2.

The pads, or covers, I, for covering the sash and insulating the forcing bed against heat loss, when necessary, comprise a rigid backing or frame formed, in the construction shown, by boards $I^1$ secured to cross pieces or battens $I^2$ and $I^3$. The cracks are preferably covered by painted canvas strips $I^{10}$. To the underside of the cover frame a suitable heat insulating backing is secured. As shown, this backing is formed by a layer of straw, or like material, secured to the boards by a web $I^8$ of canvas or other cloth, which is tacked to the edges of the wooden frame, or otherwise secured thereto. As indicated in Fig. 10, the straw at the edges of the cover or pad is arranged in bundles $I^6$, so that a firm bearing between the cover and the frames of the sashes is insured when the covers are in place on the sash. This avoids any danger of subjecting the glass of the sash to a weight greater than it can safely carry. Grooves $I^5$ may be formed, as shown, in the boards $I^1$ to permit water collecting on the upper surface of the cover to run under the battens $I^2$ and $I^3$.

To permit rain or snow water leaking through the backing boards into the straw to readily escape from the pads, openings $I^7$, which may be reinforced like eyelets, are preferably provided in the canvas $I^8$ at the ends of the latter. In the construction shown in Figs. 1 to 11, inclusive, the batten $I^3$ is placed nearer one end of the pad than the other, and is provided at its upper side with a pair of bent or looped bars $I^4$, which form eyes to be engaged by the corresponding hooks on the cover lifting and transporting vehicle or truck K.

The vehicle or truck K comprises side frames in the form of truss beams composed, in the construction illustrated, of bent pipes $K^1$, $K^1$, connected by transverse pipe sections $K^2$. The side frames are connected at one end by a cross bar $K^6$ and by inclined cross braces $K^4$. At the opposite end the side frames are connected by a cross bar $K^3$. Intermediate their ends, the side frames may be connected by one or more braces $K^9$. Adjacent the front end of the frame, an axle is secured thereto. On the axle are mounted grooved wheels $K^8$, suitably spaced apart, and having their grooves so proportioned that the wheels run readily on the tops of the vertical flanges of each adjacent pair of bars C, C, or C, CA. At the front end of the truck, hooks $K^7$ are provided, which are suitably spaced to permit their simultaneous entrance beneath the two bent bars $I^4$ carried by each cover pad. To facilitate the proper engagement of the wheels with the track rails, the upper sashes may be grooved as indicated at $G^2$ in Fig. 6.

In operation, when it is desired to transport a cover pad, the truck is run over the pad, with the wheels at opposite sides thereof, as shown in Fig. 11, and the hooks $K^7$ are passed beneath the loops $I^4$. The frame of the truck is then turned as a lever, the wheels serving as fulcrums to swing the frame into substantially the position shown in Fig. 5. This first lifts the short end of the cover pad back of the batten $I^3$ off its former supporting surface, and then, when the short end of the cover engages the axle $K^6$, or other suitable portion of the truck frame, the cover is lifted bodily until it is swung into the position shown in Fig. 5. After the pad is thus swung above the surface of the supports for the truck wheels, the truck with its load may be easily transported along the vertical flanges of the roof beams and the bars E serving as track rails, to the place where it is desired to deposit the cover pads. By preference, as in the construction shown, the cover pads, when not in use, are stacked up adjacent the wall $A^1$ and between the bars E. As indicated at the left of Figs. 1 and 2, the pads are preferably stacked when not in use so that they are oppositely inclined. This permits water to drain off and out of them, and at the same time permits the upper cover to so engage the lower cover that the canvas $I^8$ of the upper one does not engage the hooks $I^4$ of the lower one. The wheels $K^8$, of the truck, are of sufficient diameter so that one cover pad may be easily put in place on, and removed from, the other cover pad.

With the apparatus hereinbefore described, it will be readily apparent to those skilled in the art that the cover pads may be quickly and easily removed and replaced by a single attendant, and no part of the forcing bed structure is subjected to any weight which it is not well adapted to support, and this, in structures in which the forcing bed is of a width (distance between walls $A^1$ and $A^2$) much greater than has been heretofore feasible.

While the invention of course is not limited to any specific dimensions of parts, it may be worth while to mention that it has been successfully employed in connection with apparatus of the type specifically illustrated, in which the two cover pads placed end to end to cover the sashes between a single pair of rails were each about ten feet long and only slightly less than four feet in width, and each weighed nearly, if not quite, two hundred pounds.

Instead of employing means separate from the covers for transporting them, each cover may be provided with wheels or like track engaging devices which are mounted so that they may be moved relative to the cover into engagement with the track rails to lift the cover above the sash and permit its easy transportation along the track rails, or may be moved away from the track rails to allow the cover to come down on its sash and to permit the transporting devices of the covers for the adjacent sashes at the sides of the first mentioned sash to be transported. In Figs. 12 to 15, inclusive, I have illustrated one form of apparatus for accomplishing this result. In the arrangement shown in Figs 12 to 15, inclusive, the cover I itself may be identical in construction with that heretofore described, although the batten $I^3$ and hooks $I^4$ are unnecessary in this case and may be dispensed with. In this form there are two front and two rear wheels $L^4$, identical with each other and connected to the cover in the same manner. As shown, the axle $L^5$ of each wheel is mounted in a pair of trunnion collars $L^6$, each of which is pivotally connected between the arms M of one of a corresponding pair of bell crank levers. The bell crank levers are fulcrumed at $M^3$ in suitable bearing blocks $M^2$ secured to the rigid backing of the cover. The second arms M¹ of the bell crank levers for each wheel are connected together by links M⁴, and the arm M¹ of the inner bell crank lever for each wheel has pivotally connected to it a block N to which is pivotally connected one end of a connecting rod N¹. The inner ends of the connecting rods N¹ for each front pair of wheels are swiveled to a collar N² carried by a rod N³ which lies above the center of and extends longitudinally of the corresponding cover. The rods N¹ of the rear wheels are similarly connected to a second collar N². The rod N³ is supported in bearing blocks N⁴ so as to be movable in the direction of its length relative to the cover. The rod N³ is connected at one end by a link O to an operating lever P. The lever P is fulcrumed at P² to a bracket P³ secured to the rigid backing of the cover.

It will be readily apparent that by swinging the operating lever P on its fulcrum, to move the rod N³ in the direction of its length, the wheels L⁴ may be easily moved from the full line positions shown in Figs. 12 and 13 into the dotted line positions shown in those figures, which are the same as the full line position shown in Fig. 14. When the wheels are in the full line positions of Figs. 12 and 13, the cover is not supported by the wheels, but rests on the sash when in place over the latter or when removed upon some suitable support. In this condition of the apparatus the wheels are at the inner sides of the two track rails at the outer side of the cover and do not interfere with the use of those rails by the wheels of the transporting mechanism for the covers for the sashes at the outer side of the track rails. When the wheels are in the position indicated in full lines in Fig. 14, they engage the track rails and carry the weight of the cover which is lifted above the sash as shown in Fig. 14. By preference, when the wheels are in the position shown in Fig. 14, the lever P is swung into the position indicated in Fig. 15 where the fulcrum point P¹ is below the line drawn through the axis of fulcrum P² and the pivotal connection between the rods O and N³, so that the lever P is automatically locked against accidental return movement which would permit the cover to be lowered relative to its supporting wheels.

Having now described my invention, what I claim as new, and desire to secure by Letters Patent, is:

1. In a forcing bed, the combination with the roof sashes and removable covers therefor, of beams supporting the sashes and covers, and formed with guide surfaces for cover transporting means.

2. In a forcing bed, the combination with the roof sashes and removable covers therefor, of beams supporting said sashes and covers formed by flanged bars having lateral sash supporting flanges and vertical flanges adapted to serve as guides for cover transporting means.

3. In a forcing bed, the combination with the roof sashes and removable covers therefor, of beams supporting the sashes and covers and formed with guide surfaces for the wheels of a cover transporting vehicle, and a vehicle having flanged wheels adapted to run along the guide surfaces of said beams, said vehicle and covers having coöperative provisions whereby the covers may be lifted and transported by the vehicle.

4. The combination with the side walls of a forcing bed, of a roof construction therefor, comprising parallel equally spaced apart flanged bars having vertical flanges adapted to serve as track rails for a cover transporting vehicle and having lateral sash supporting flanges, sashes supported by the last mentioned flanges, rigid backed heat insulating pads adapted to be placed between the vertical flanges of each adjacent pair of bars to cover the sashes supported between said bars, and a vehicle having flanged wheels adapted to run on the vertical flanges of said bars and having provisions for lifting and transporting said pads.

5. In a forcing bed, the combination with the roof sashes and removable covers therefor, of beams supporting the sashes and formed with surfaces whereby said beams may serve as track rails for a cover transporting means, and heat insulating covers for the sashes, comprising a rigid frame and a non rigid layer of heat insulating material secured to the underside of said frame.

6. In a forcing bed, the combination with the roof sashes and removable covers therefor, of beams supporting the sashes and formed with surfaces whereby said beams may serve as track rails for a cover transporting means, and heat insulating covers for the sashes, comprising a rigid frame and a non rigid layer of heat insulating material secured to the underside of said frame and made thicker adjacent its margin than in the body portion of the layer.

7. The combination with the side walls of a forcing bed, of a roof construction therefor, comprising parallel sash and cover supporting beams arranged to serve as track rails for cover transporting means, and track rails in alinement with said beams at one side of said forcing bed between which said covers may be stored.

8. The combination with the side walls of a forcing bed, of a roof construction therefor, comprising parallel sash and sash cover supporting metal beams, said beams having vertical flanges adapted to serve as track rails for sash cover transporting means and having lateral flanges at their lower edges adapted to serve as sash supports, and a heat insulating cover for the underside of each beam.

9. The combination with the side walls of a forcing bed, of a roof construction therefor, comprising parallel sash and sash cover supporting metal beams, said beams having vertical flanges adapted to serve as track rails for sash cover transporting means and having lateral flanges at their lower edges adapted to serve as sash supports, and a heat insulating cover for the underside of each beam, said insulating cover comprising a pair of strips of heat insulating material secured against each beam in the form of a V shaped trough with the lower edge of the beam entering the top of the trough.

10. The combination with the side walls of a forcing bed, of a roof construction therefor, comprising parallel sash and sash cover supporting beams each in the form of a metal T bar having a vertical flange adapted to serve as a track rail for cover transporting means and having lateral sash supporting flanges at the lower edge of said vertical flange, and spacer strips secured to one portion of each beam above said lateral flanges whereby the underside of a sash supported thereby is brought above a sash supported directly on the lateral flanges of another portion of the beam.

11. The combination with the side walls of a forcing bed, of a roof construction therefor, comprising parallel equally spaced apart flanged bars having vertical flanges adapted to serve as track rails for a cover transporting vehicle and having lateral sash supporting flanges, sashes supported by the last mentioned flanges, heat insulating pads adapted to cover the sashes supported between said bars, and a vehicle having wheels adapted to run on the vertical flanges of said bars and having provisions for lifting and transporting said pads.

FREDERICK W. TAYLOR.

Witnesses:
 ARNOLD KATZ,
 D. STEWART.